(12) United States Patent
Ploski

(10) Patent No.: US 6,619,640 B1
(45) Date of Patent: Sep. 16, 2003

(54) SUPPORT AND ROTATING APPARATUS FOR HEAVY VEHICLE COMPONENTS MOUNTED ON A CARRIAGE

(76) Inventor: Gregory Ploski, 88 Purdy St., Waterbury, CT (US) 06706

( * ) Notice: Subject to any disclaimer, the term of this patent is extended or adjusted under 35 U.S.C. 154(b) by 135 days.

(21) Appl. No.: 09/941,514

(22) Filed: Aug. 28, 2001

(51) Int. Cl.[7] .................................................. B23Q 3/00
(52) U.S. Cl. ............................ 269/17; 269/60; 269/61; 269/71; 269/50
(58) Field of Search ............................ 269/17, 51, 60, 269/61, 71, 50, DIG. 16, 7 B, 7 C, 98; 248/676

(56) References Cited

U.S. PATENT DOCUMENTS

| 4,239,196 | A |   | 12/1980 | Hanger |   |
|---|---|---|---|---|---|
| 4,705,264 | A | * | 11/1987 | Hawkins | ...................... 269/17 |
| 4,760,997 | A |   | 8/1988 | Fager |   |
| 5,127,638 | A | * | 7/1992 | Kent | ........................... 269/17 |
| 5,775,667 | A |   | 7/1998 | Tassic |   |
| 5,863,034 | A |   | 1/1999 | Vauter |   |
| 6,318,699 | B1 | * | 11/2001 | Williams | ..................... 248/676 |
| 6,491,293 | B1 | * | 12/2002 | Brewer | ......................... 269/17 |
| 6,516,694 | B1 | * | 2/2003 | Easton et al. | ................... 83/54 |

* cited by examiner

Primary Examiner—Joseph J. Hail, III
Assistant Examiner—Daniel Shanley

(57) ABSTRACT

The present invention relates to a vehicle component support carriage for maneuvering heavy engines, transmissions, or vehicle rear end differentials while those components are being serviced. The apparatus includes a wheeled carriage that supports an enclosed drive apparatus used to incrementally rotate the heavy component for servicing, replacing parts or cleaning the component. The apparatus support apparatus is arranged so that a removable portion of it is aligned and secured to the first engagement member before the heavy component is assembled to the wheeled carriage on a journaled shaft that is operatively connected to the drive apparatus. The removable portion of the support apparatus is pre-disposed with a pattern of mounted apertures or hardware that will present a balanced assembly when loaded on the carriage support apparatus. A second variation enables servicing of two engines at once, both engines being balanced and supported similarly.

3 Claims, 16 Drawing Sheets

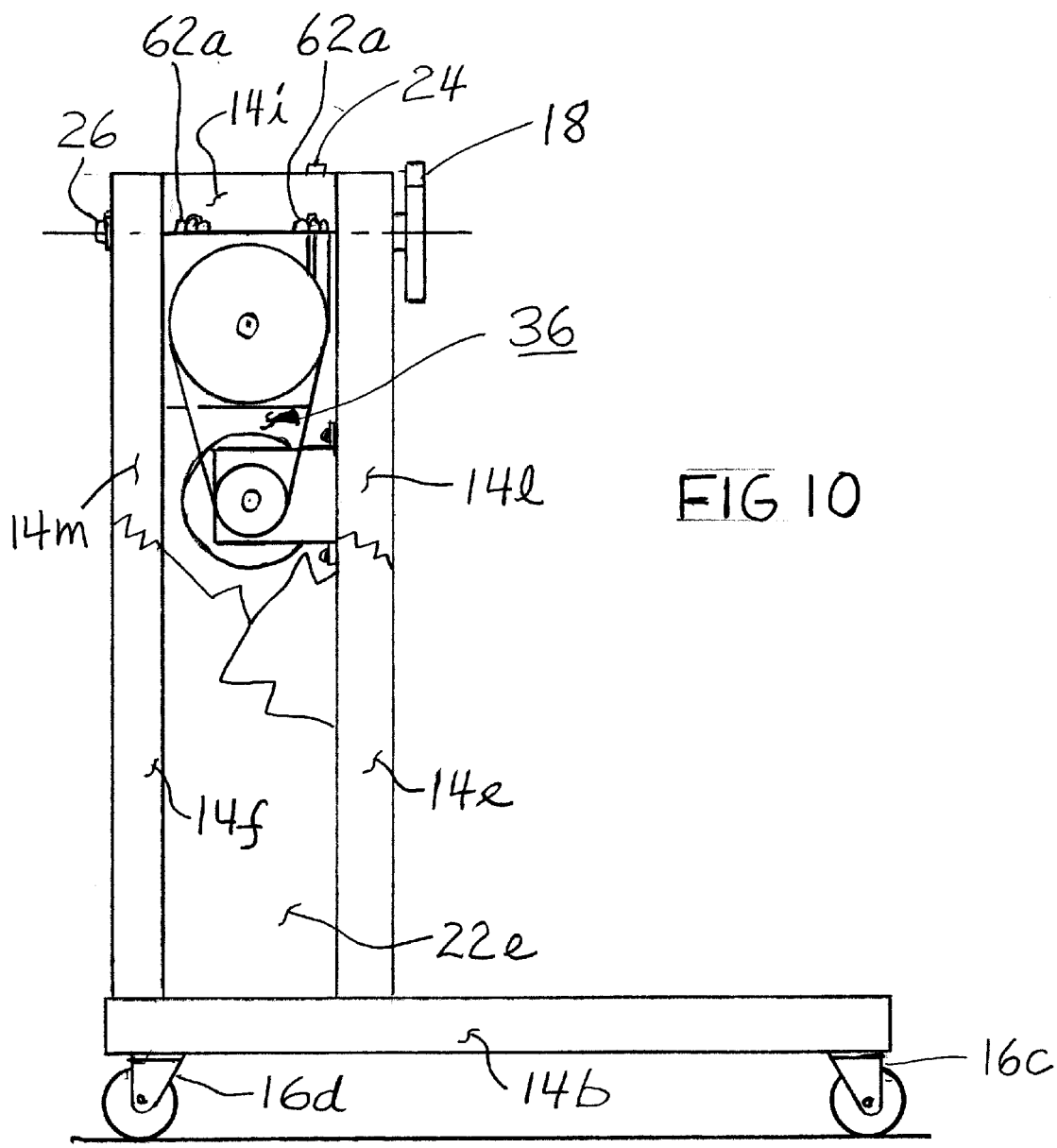

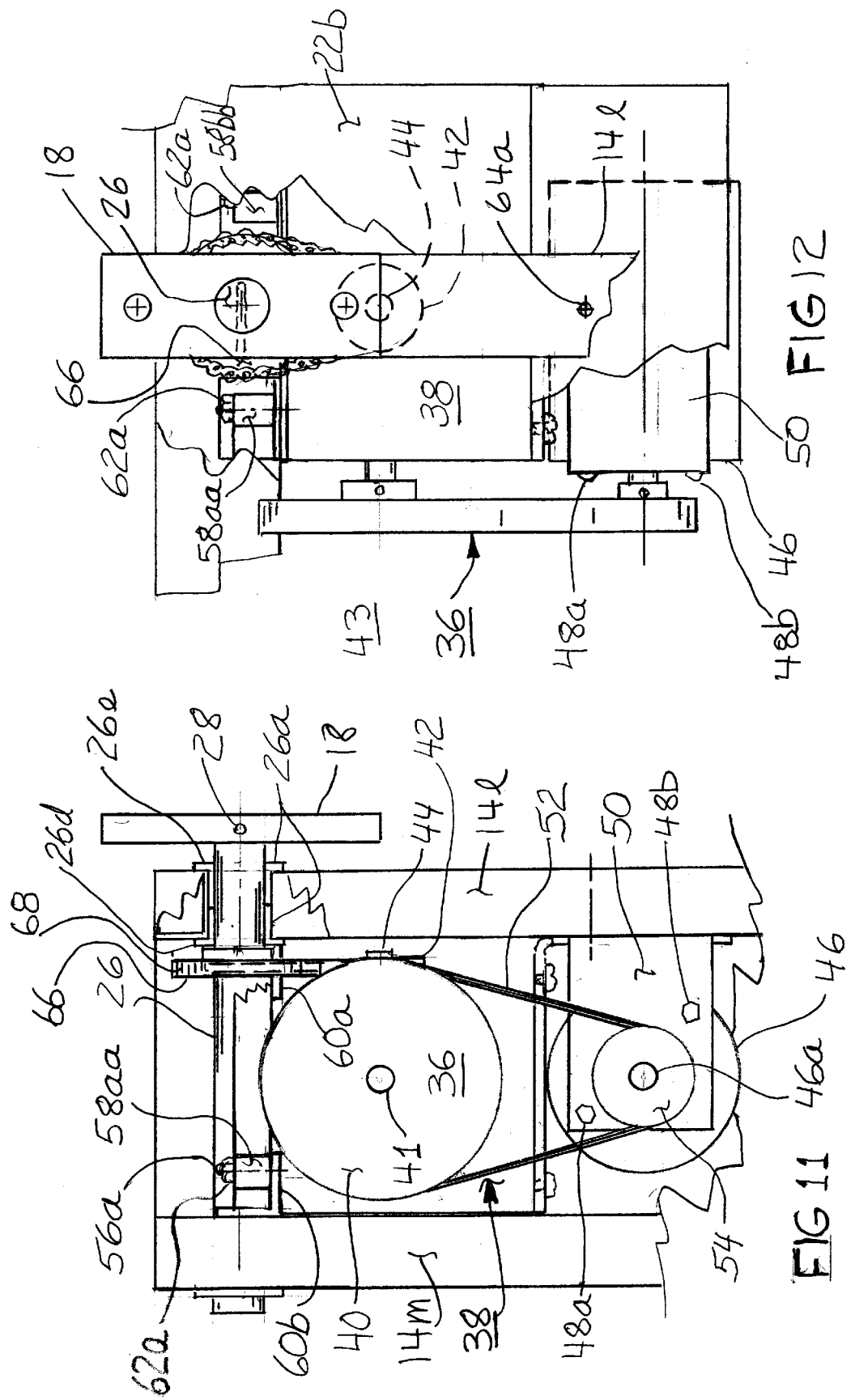

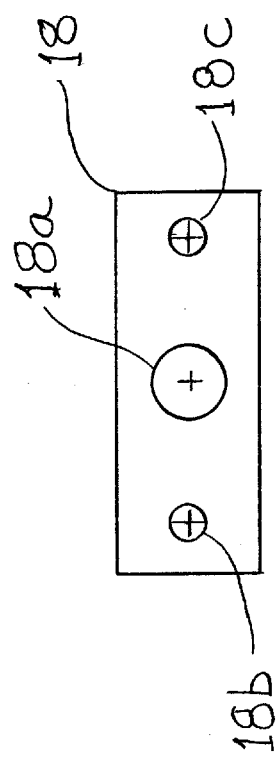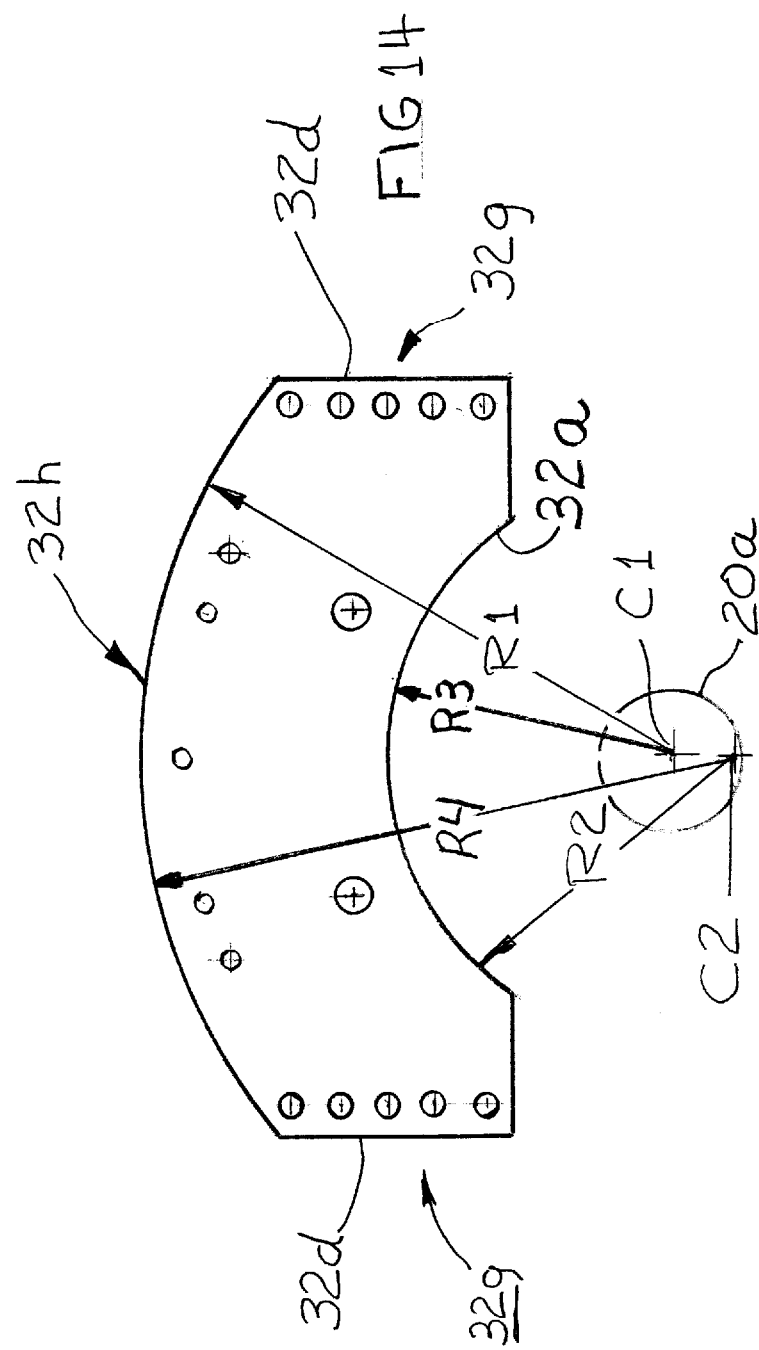

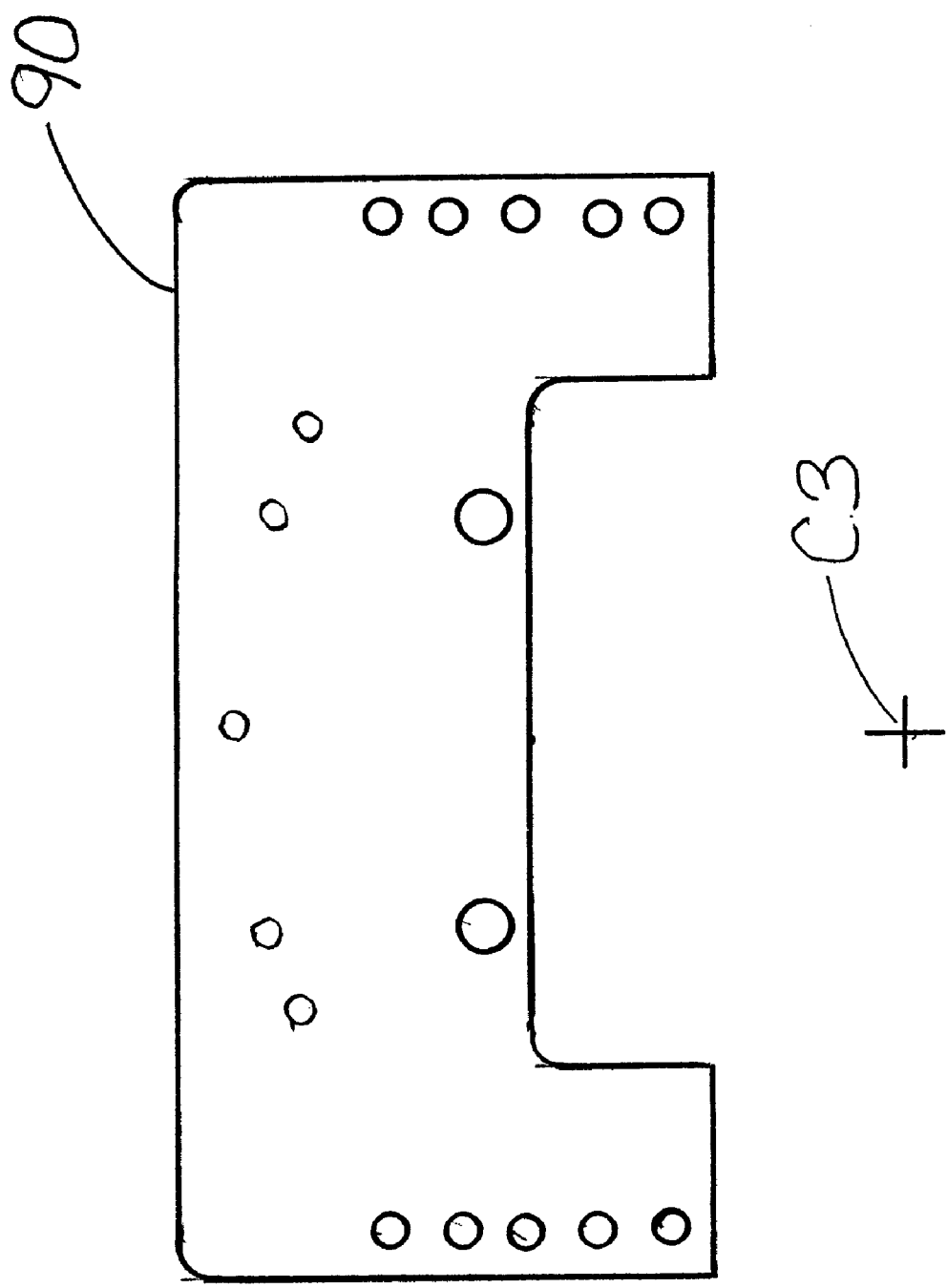

SUPPORT AND ROTATING APPARATUS FOR HEAVY VEHICLE COMPONENTS MOUNTED ON A CARRIAGE

FIELD OF THE INVENTION

The invention disclosed herein relates generally to the handling of various kinds of major vehicle components including motor engines, transmissions and rear end differentials. There is currently a need to provide a way of supporting such equipment for service purposes or inspection. This can be accomplished by rotating the subject component through a small angular increment or up to and beyond as much as 180 degrees while the component is suspended in a substantially horizontal position. The subject may also be suspended in a vertical position for rotation, depending on how easy it may be to load the subject into a support. The horizontal position is better for the work position, since the subject may be at a vertical level that is easier on the mechanics back, and is more adaptable to loading the subject component on to a carriage for mobility. In many instances it is desirable to rotate the vehicle component through a small angle, or some greater angle in order to work on parts that are arranged around its periphery. The ability to completely rotate or spin such components affords an opportunity to work on and inspect the different external and internal areas of the component that need repair, replacement and so forth. The supporting equipment such as a wheeled carriage must also be flexible in providing an ability to move the vehicle components about the work area where the repair and inspection of the component is to take place. To accomplish this, a carriage with wheels is typically used. The supports that attach to the vehicle components for rotating or manipulating them are typically attached by links that are adjustable on the carriage. To date there is a limited assortment of equipment available to handle the vehicle components described above for servicing and inspection The equipment that is available has some deficiencies related to safety of the mechanic or operator who is involved with the work. In addition, the equipment presently available does not afford the ability to incrementally position the vehicle components in different angular positions without causing an unbalanced condition where the component may suddenly move to an undesired position. Another problem with the prior art is that incremental angular adjustments of the components may require loosening of the attachment devices. Therefore, it is objectionable to have to adjust the attachments devices at all since it may cause an unanticipated problem. Any sudden movement of a heavy mass such as a motor vehicle engine could cause an injury to the mechanic who is working with this type of equipment.

BACKGROUND OF THE INVENTION

The prior art that is available and thought to be utilized in a repair shop for engines, transmissions, differentials and the like is for example U.S. Pat. No. 4,705,264 to Hawkins et al for WHEELED STAND ASSEMBLY. Another US Patent represents a way to handle vehicle components such as that described above is U.S. Pat. No. 5,863,034 to Vauter et al for WORK PIECE STAND. And, yet another patent is U.S. Pat. No. 4,239,196 to Hanger for ENGINE STAND.

The carriage for handling vehicle components as described above in the listed references is typically provided with some form of wheels, and the components are typically loaded into the unit with the mass being centered over the frame of the carriage. This typically is a design that will afford one degree of safety in that the heavy component should not tip over when moved with the carriage. In U.S. Pat. No. 4,760,997 a mechanism is provided to lift the vehicle component when necessary. (In this case an engine). In addition an attachment mechanism is provided to fit to an engine to be lifted to a desired position. The attachment mechanism includes an engagement plate or mounting plate that may be secured to the engine, this part being essentially round in nature, presumably surrounding the area of the engine crankshaft. Another reference is U.S. Pat. No. 5,775,667 to Tassic for MOTORIZED ENGINE STAND.

Due to working conditions in an actual mechanics environment, there is a need for additional safety measures, and an easier method of handling the large mass of motor vehicle engines, transmissions, and differentials and so forth. There are instances where the attachment devices are either not properly secured, or must be adjusted in order to gain access to some portion of the component being worked on. Due to the very heavy nature of such components, it is easy to accidentally miscalculate or inappropriately loosen some portion of the component attachment means from the supporting carriage. This of course could easily result in an injury to the mechanic who is working on the subject matter.

For these reasons, the present invention is now provided to address the need to be able to safely rotate the vehicle component for repair work, inspection or replacement of parts that require same. At the same time, it is another principal of the present invention to be able to rotate the mass of such components in incremental or predetermined amounts that will provide the required access or inspection without disassembling the supporting attachments in any way. The present invention solves the problems of maintaining a connection of the carriage support mechanisms to the vehicle component because there is no disassembly required, and the component may be viewed from an infinite number of perspectives for the required work. The vehicle component is balanced in the assembly of the mechanisms to be described in the accompanying specification by virtue of a universal system of attachment devices that will adapt to a variety of vehicle components as manufactured by different companies.

It is part of the present invention to provide a way of adapting the attachment devices to the vehicle components via a template like system that is pre-determined to be adaptable to many such vehicle components as are manufactured and available in the world. The present invention will teach that it is possible to predetermine the mounting arrangement of for example an engine block with that of a mounting support plate that will secure the engine block to the mounting support mechanism so that the entire resulting mass is balanced as an inertial mass when installed horizontally or substantially horizontally to a support apparatus on a carriage. The end configuration of such engines and the like is very similar in that there are either tapped holes or threaded studs protruding from the machined ends of the engine block. It has been discovered that it is possible to design a universal mounting plate that will match such mounting arrangements on the engine block and the like so that when assembled to another symmetrical mounting plate on a carriage supported spindle or shaft, the result will be that the resulting assembled, mounted mass will be balanced for rotation. The balanced mass is now ready to be incrementally moved, or moved with a constant, slow velocity that affords the mechanic the opportunity to inspect the engine block and such until a desirable position is found for work or further inspection.

One other point the present invention will address is being able to turn certain parts of the vehicle component assemblies when the component assembly is mounted in the support and rotating apparatus. This is especially true of an engine, where the mechanic may have to reach the end plate of the engine crank shaft in order to turn the crank shaft and move the connecting parts that act upon the turning shaft. The present invention provides a way to permit access to the end of the crank shaft of an engine so that the crank shaft may be turned when necessary.

Yet another feature of the present invention is another embodiment where the vehicle component apparatus designed with a way to hold two engines or other vehicle components at once. This is important since in the mechanic's shop it has been found that it is desirable to be able to transfer parts from one engine to another in the re-building stage. Having the apparatus index able in incremental steps allows the mechanic to make a direct removal of parts in one engine, and to transfer them immediately to the same area in the new engine block.

Yet another feature is in the shape of the vehicle component carriage frame in the area of the vehicle component support structure. An embodiment is shown in the following specification wherein the frame is relieved, thereby providing even better access to the end of the vehicle component such as an engine and associated crankshaft. All of the above will be described in the following specification including the several embodiments that provide the benefits of maneuverability, and safety for vehicle components.

SUMMARY OF THE INVENTION

The present invention provides a carriage mounted support and rotatable positioning apparatus for vehicle components such as motor engines, motor transmissions, or rear end differentials. The apparatus is constructed as an "L" shaped vehicle or carriage that is suspended on wheels for mobility. There is a first engagement member mounted for driven rotation with a shaft journaled in the frame of the apparatus. The first engagement member will align with a second engagement member that has a pattern of apertures or attachment devices that match a corresponding pattern of apertures or attachment devices of at least one kind of vehicle component. The combination of the first and second engagement members that attaches to the vehicle component forms a balanced assembly that is inertially balanced for rotation when driven by an attached electromechanical drive apparatus that is part of the carriage apparatus. The resulting balanced vehicle component may be indexed in small angular rotational positions, or rotated to 180 degrees or more depending on need.

The second engagement member is shaped with a cutout portion that enables access to the crankshaft assembly of an attached engine when it is necessary to turn the crankshaft assembly.

Alternate embodiments include a carriage that will suspend a second engine in line with a first engine mounted on one side of the carriage, to enable direct transfer of critical engine components from one engine to the other in predetermined angular positions as powered by the included drive apparatus.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 10 is a side elevation view of the apparatus taken along the same lines as FIG. 3, with a side cover removed to show the internal drive apparatus within the upper leg of the "L" shaped frame;

FIG. 11 is a partially enlarged and broken away elevation view taken along the same lines as FIG. 10 to show details of the internal drive apparatus of the apparatus within the upper leg of the "L" shaped frame;

FIG. 12 is a partially enlarged and broken away end view relating to FIG. 10, showing the details of the internal drive apparatus of the apparatus within the upper leg of the "L" shaped frame;

FIG. 13 is a slightly enlarged detail view of the first component engagement member;

FIG. 14 is a slightly enlarged detail view of the second component engagement member;

FIG. 15 is a slightly enlarged detail view of an alternate design of the second component engagement member;

DETAILED DESCRIPTION OF THE PRESENT INVENTION

Figure 1:
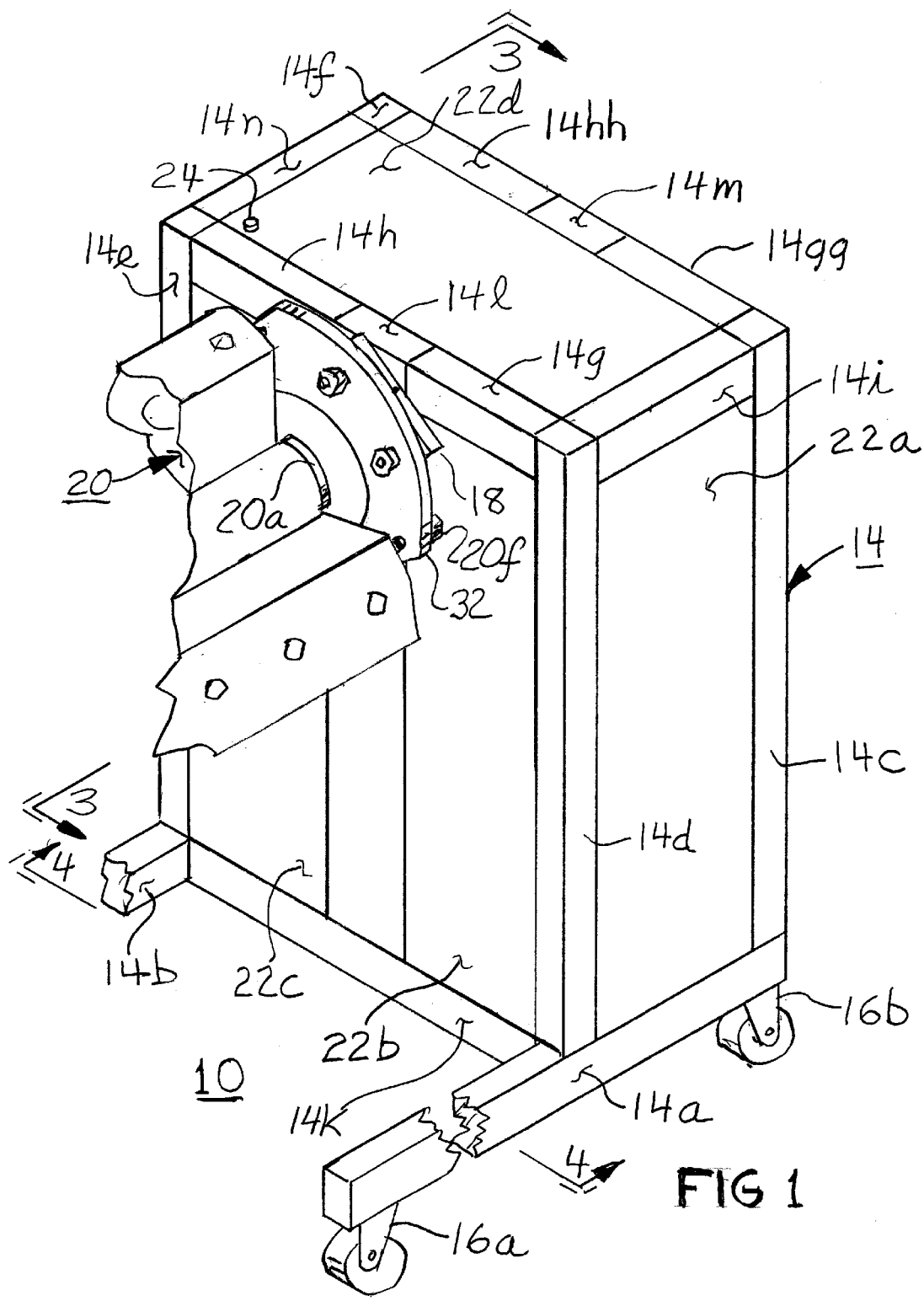
FIG. 1 is an isometric view of the vehicle component support and rotating apparatus showing an engine mounted for service or inspection.

In describing the present invention, reference is made to the drawings, wherein there is seen in FIG. 1 a partial isometric view of a vehicle support and rotating apparatus 10. The apparatus 10 is generally mounted within a carriage frame 14 which is formed of welded steel members. The carriage 14 is generally constructed in an "L" shape in order to support the heavy vehicle components in the raised, or vertical portion of the "L" shape that may also be referred to for example as a "leg", "an upstanding framed box", "an upstanding leg", a "vehicle component support frame" or "L" shaped carriage frame 14 or "carriage frame 14" that is used in the present specification. Describing the carriage frame 14 construction further, there is a horizontal base leg 14a and 14b which form part of the base of the apparatus 10. The carriage frame 14 is constructed of steel generally of rectangular section for example 2 inches by 3 inches cross section of ⅛ inch wall thickness. This type of steel product or similar dimensioned product is readily available from many distributors, and is very suitable for a welded product.

There is a vertical leg member 14c, 14d, and 14e shown in FIG. 1. A fourth vertical leg member 14f may be seen in more detail in other views of the drawings of the present invention, however it will be apparent to those skilled in the art that many combinations of vertically disposed legs, struts, braces or the like will complete a vertical frame portion of the "L" shaped frame construction that is desirable to support heavy loads once suitably welded, or bolted together. The vertical members may be substantially vertical as well, meaning that they may be reinforced by other braces; struts etc., disposed at an angle or angles that reinforce the structure intended for support the heavy vehicle components. The carriage frame 14 will be seen in different views accompanying the present specification and the aforementioned parts will be referenced there.

Figure 2:
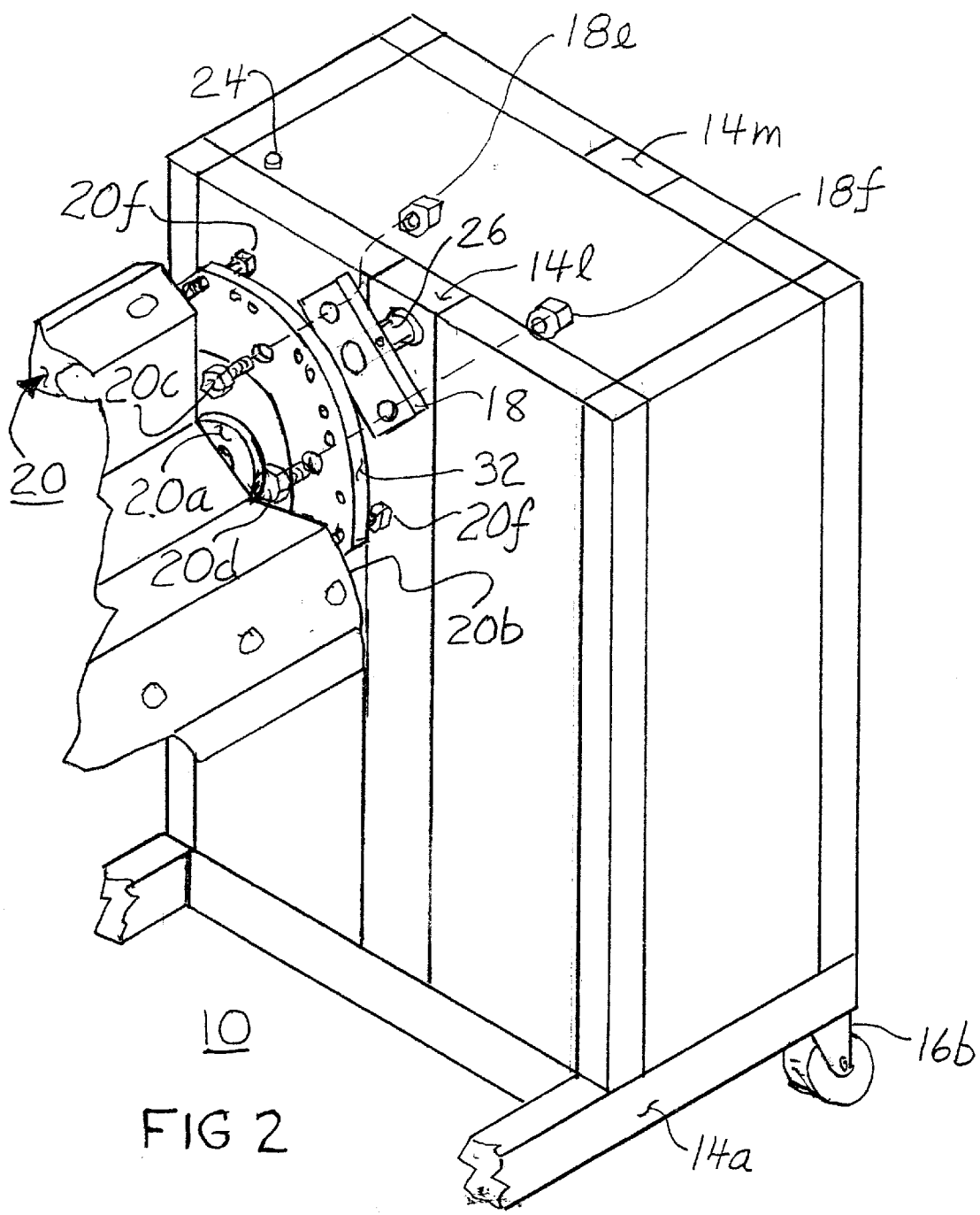
FIG. 2 is an isometric view taken along the same lines as FIG. 1, showing the attachment parts that hold the engine; the engine and associated support parts being slightly separated from the carriage structure and frame for clarity.

There is a cross member 14g, a corresponding cross member 14gg welded to a top cross member 14i and a cross member 14h and 14hh and corresponding cross member 14n that are welded together with a vertical frame member 14e and 14f respectively. The cross member 14g and 14h are welded to the member 14l, and correspondingly, the cross member 14gg and 14hh are welded to the member 14m. The member 14i is welded to the vertical legs 14d and 14c. This arrangement forms a box like structure of the vertical portion of the "L" shaped carriage 10. The vertical leg member 14c, 14d, 14e, and 14f (14f shown in FIG. 3) are all welded to the horizontal base leg 14a and 14b where appropriate. In addition, there is a lower cross brace member 14k that is welded to the horizontal legs 14a and 14b, in addition to the vertical leg member 14l. All of the members described above such as 14a–14n as fastened together, form a box like structure having a vertical box portion that provides support for an attached overhanging load like an engine 20 as depicted in FIGS. 1, 2 and 3.

Thus, the structural frame components and members 14a–14n as described are securely attached to each other or other components in the carriage frame 14 to form a solidly constructed "L" shaped carriage frame 14 that is the basis for the mounting of the vehicle components and component support apparatus. The frame 14 and general apparatus 10 are considered to be one assembly for the purposes of the present specification. The carriage 10 and accompanying frame 14 will support a heavy vehicle component like a V8 engine, a V6 engine, a straight 6 engine, a transmission, or a rear end differential from a motor vehicle. The symmetrical nature of the welded construction of the apparatus 10 and associated carriage frame is designed so that the assembly of a vehicle component to the frame 14 is generally centered within that framework, and will not tip over.

Referring to FIG. 1 once again, the carriage frame 14 is suspended from the floor by two sets of rollers. There is a first of two different kinds of rollers used with the apparatus 10. A first roller assembly 16a and a second roller assembly 16b are secured to the bottom of the horizontal leg 14a. Similarly, there is the same type of rollers secured to the horizontal base member 14b (FIG. 3). The wheel of the roller assembly 16a does not spin freely (non-steering roller) whereas the wheel of the roller assembly 16b (steering roller) does spin or swing, thereby providing a turning and steering capability of the carriage frame 14 with or without a suspended load. There is a similar roller 16c and 16d, (FIG. 3) which are fastened to the horizontal leg 14b. The roller 16c (non-steering) does not swing or pivot, whereas the roller 16d (steering) does swing and pivot while the carriage frame 14 is moved about. This arrangement for mobility is found to work best when a heavy vehicle component such as those described above is attached to the carriage frame 14.

Figure 3:
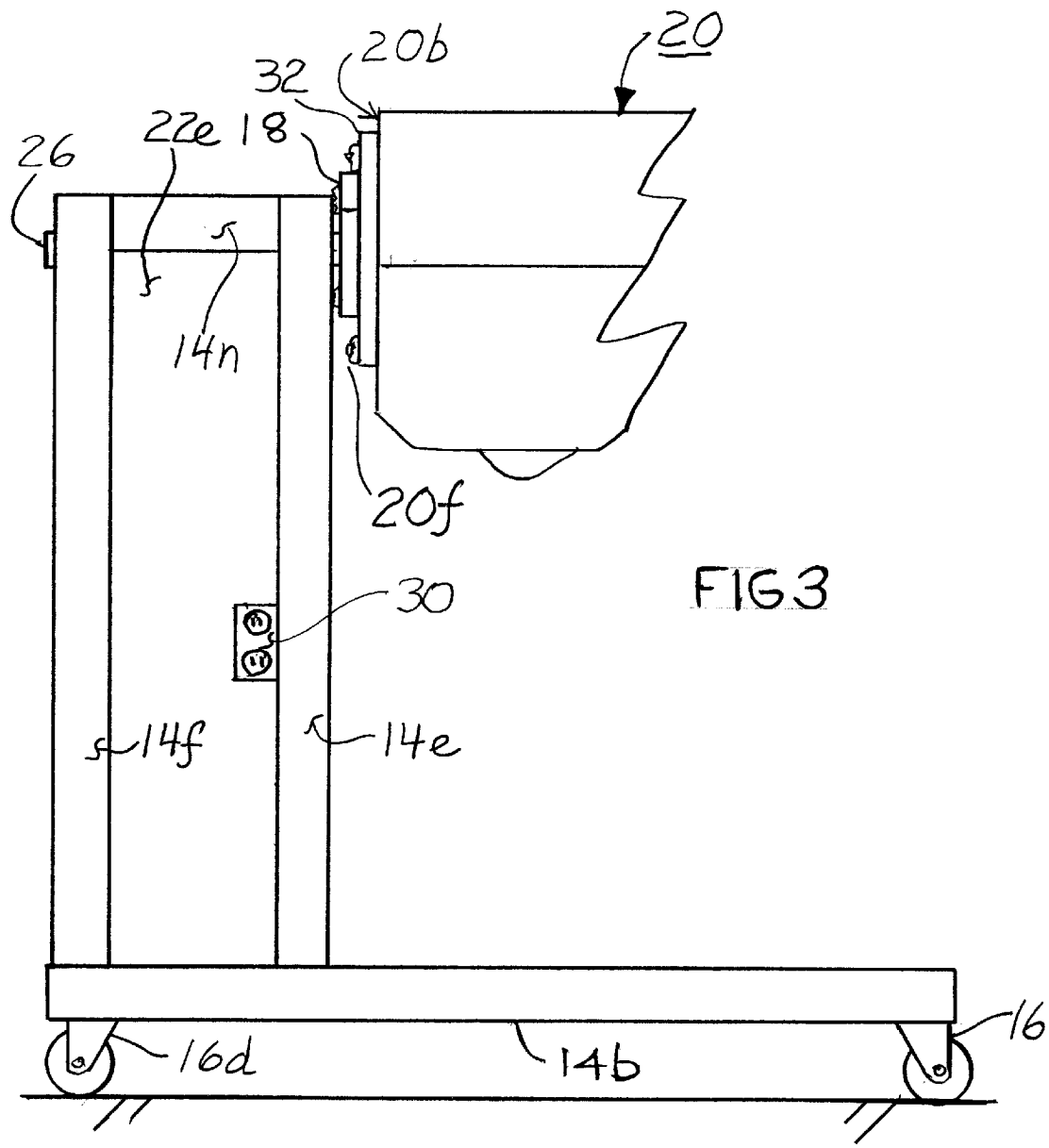
FIG. 3 is an elevation view of one side of the apparatus of FIG. 1 as viewed along the lines 3—3 showing the mounting of the first component engagement member, the second component engagement member and part of an engine mounted to the carriage and supporting frame apparatus.

The apparatus 10 and associated frame 14 is also covered by panels, as illustrated in FIG. 1 where there is a cover 22a, 22b, 22c, & 22d with additional covers that are on other sides of the apparatus, and shown in other views of the present invention (for example a cover 22e in FIG. 3). The covers 22a, 22b, 22c, 22d, and 22e are fastened to the carriage frame 14 with appropriate fastening devices, not shown but understood to be part of the overall assembly of the apparatus 10 and provided for operator protection. There is also a vehicle component jogging button 24, which will permit the operator to discriminately rotate a vehicle component at will either in incremental amounts, or as much as 180 degrees or more. It should be noted that there may be one or more of these jogging buttons to rotate the vehicle components. The button 24 is connected to the drive motor through a circuit to be described later in this specification.

The operational components of the vehicle support and rotating apparatus 10 will now be described as reference is made to the remaining drawings. For example, in FIG. 2, there is a slightly different perspective (engine and supporting component members are slightly separated) of the carriage 10 in that this view illustrates a first component engagement member 18 which is attached to a journaled shaft 26 that is mounted in the frame 14 as will be described in detail in the following specification. In addition, there is a second vehicle component member 32, located intermediate between the first component member 18 and the engine 20.

Referring to FIG. 3, a side view of the carriage frame 14 is seen with the engine 20 suspended in position as supported by the engagement members to be described in additional detail later. In FIG. 3 the wheels 16c and 16d are seen in addition to the vertical leg 14e and 14f. There is an electrical junction box 30 located within the cover 22e as viewed in FIG. 3; the box 30 being adaptable to a 120 V circuit which is connected to an AC ½ HP motor for the purposes defined in the present specification (the motor and an associated mechanical drive apparatus described later).

Figure 5:
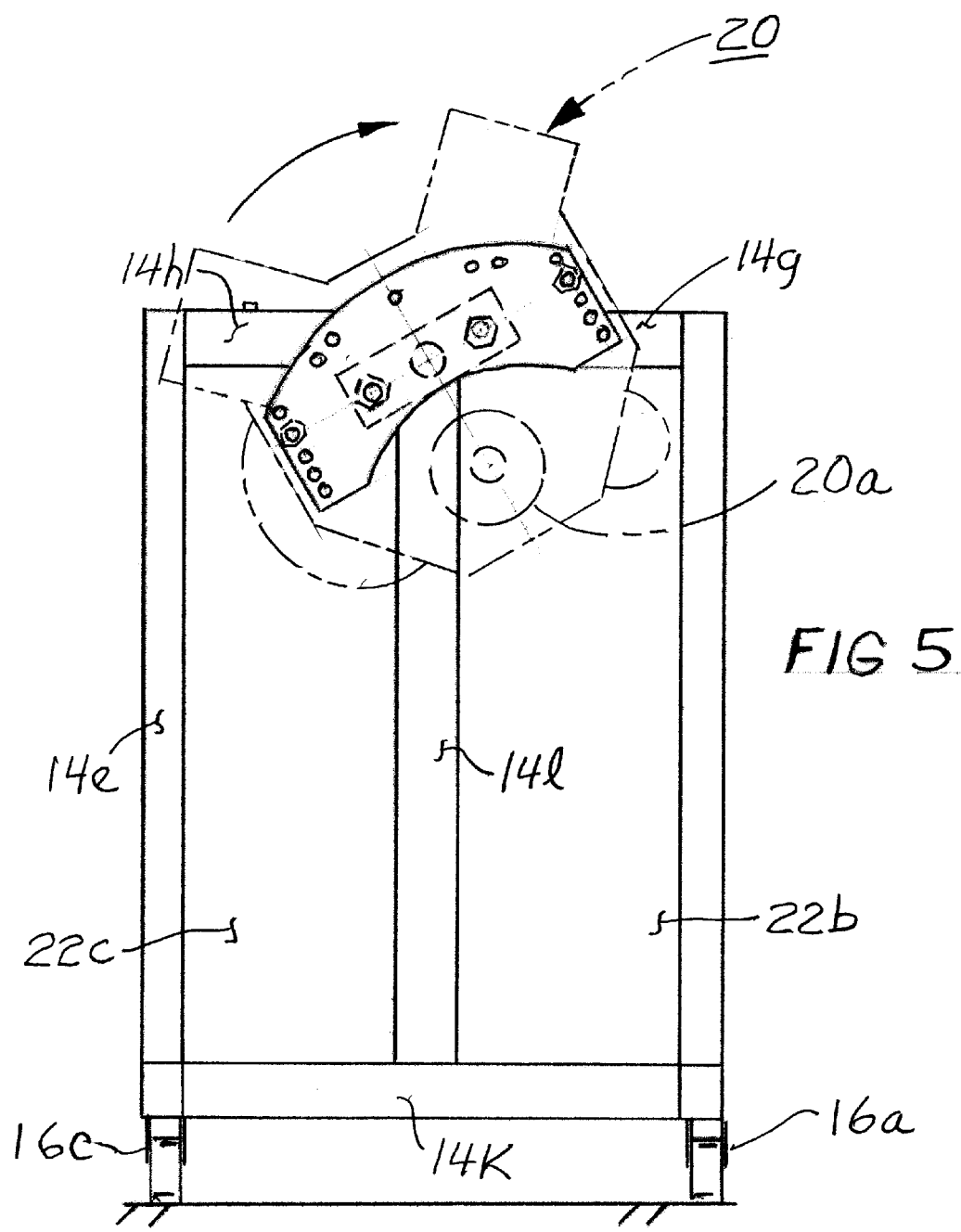
FIG. 5 is an end elevation view taken along the same lines as FIG. 4, showing an outline of an engine supported on the carriage frame as supported by the first and second engagement members.

Referring now to FIG. 5, there is shown an end elevation view of the apparatus 10 with an end profile of the engine 20 as it is attached to the second component engagement member 32. In this view the first engagement member 18 is behind the second engagement member 32, but secured to same with attachment hardware such as ½ inch diameter bolts and accompanying ½ inch nuts and appropriate lock washers (not shown). The engine 20 is seen in this view to give the reader a perspective of how an engine would be mounted on the carriage frame 14 and supporting structure. There is also shown a crankshaft assembly 20a (FIGS. 1, 2 & FIG. 5) that presents an idea of the relationship of the second component engagement member 32 to some of the engine components that are functional.

Figure 4:
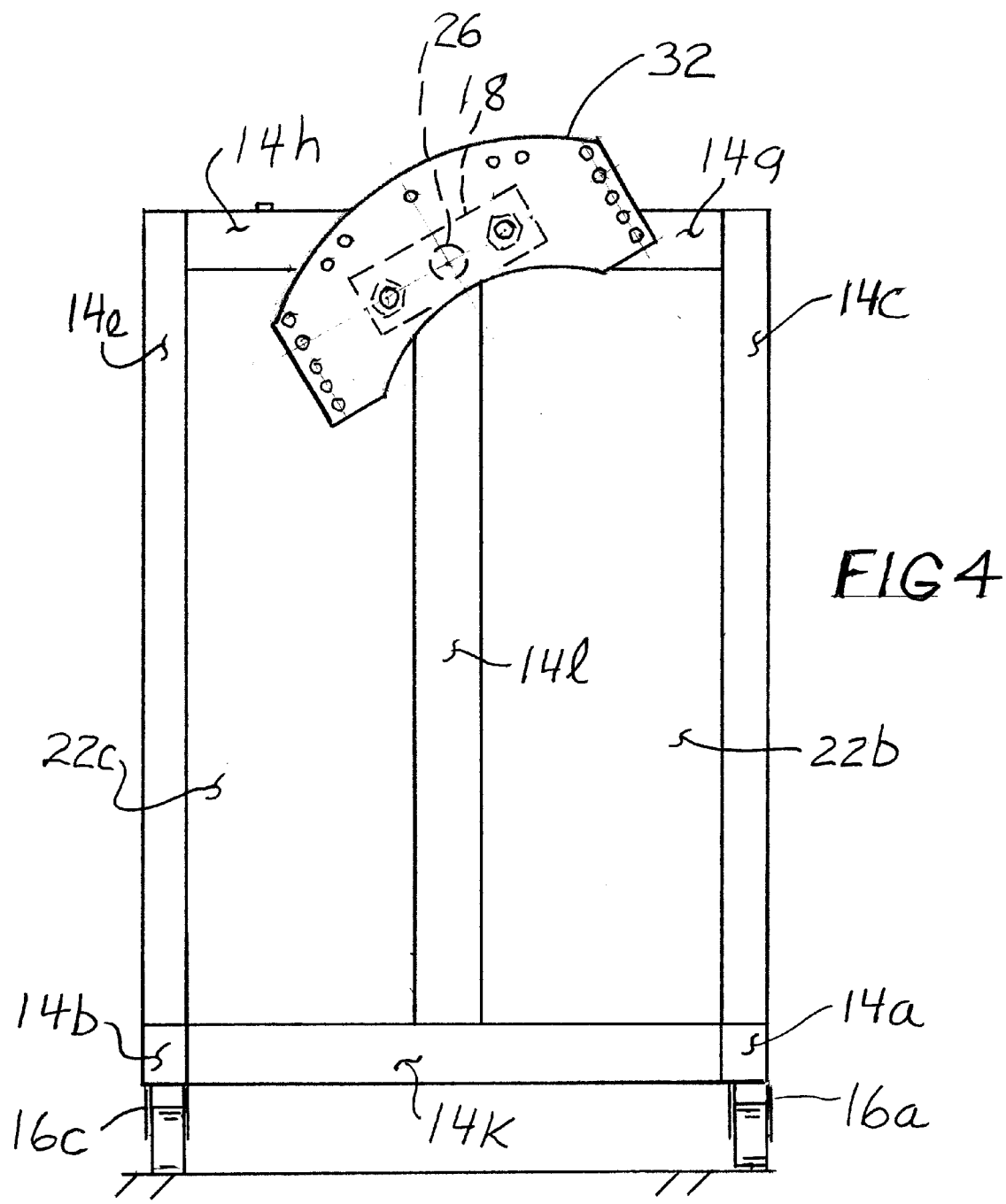
FIG. 4 is an end elevation view of the apparatus taken along the lines 4—4 from FIG. 1 showing the second component engagement member attached to the first component engagement member with the relationship to the journaled shaft holding these parts.

In FIG. 4, the same view as taken along the lines of FIG. 5, the engine 20 is removed, leaving the first engagement member 18 and second engagement member 32 illustrated as mounted in the carriage frame 14. This is the arrangement that is used to secure the engine 20 to the carriage frame 14 and associated support apparatus through the use of mounting hardware to be explained later.

Figure 6:
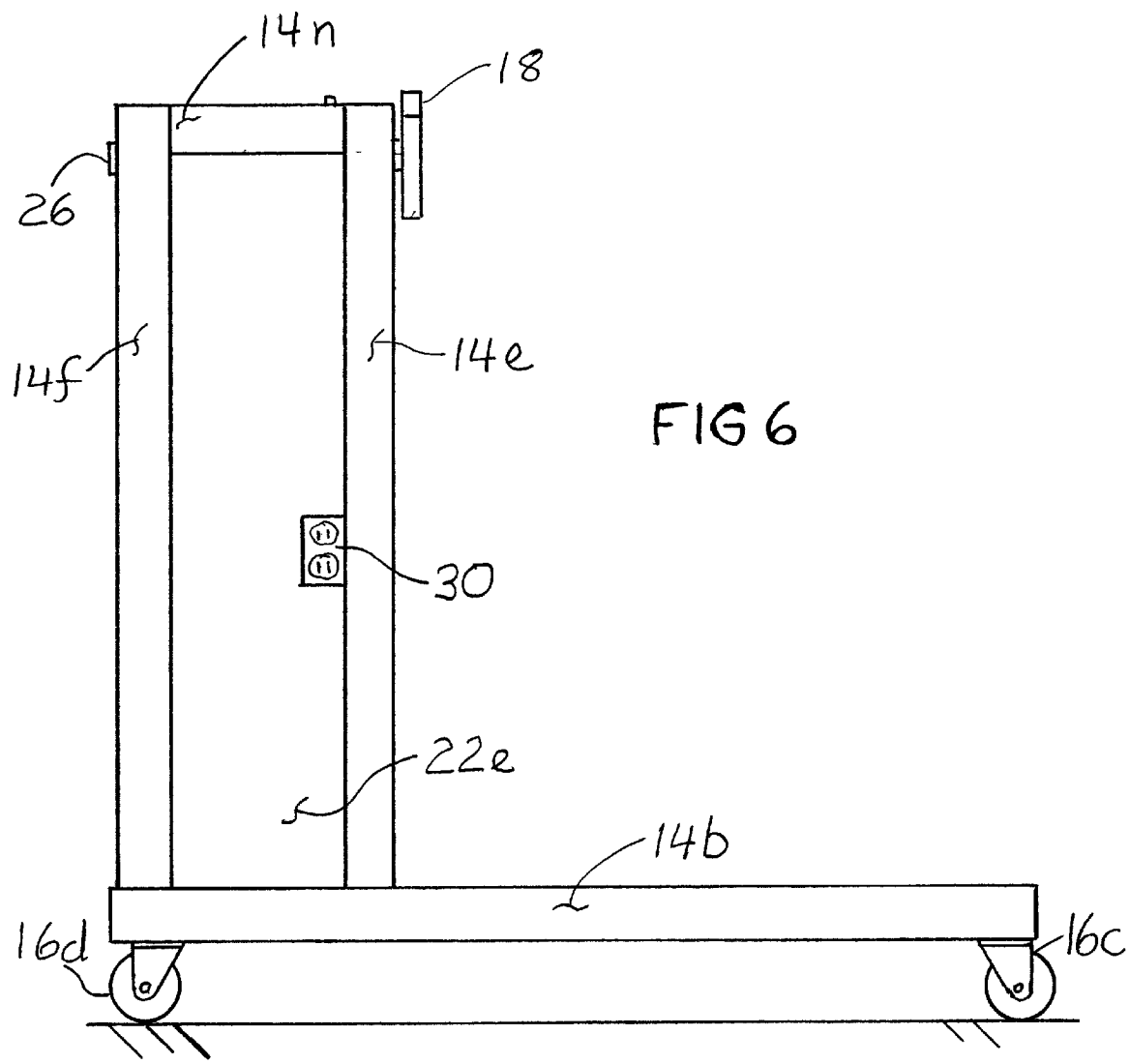
FIG. 6 is a view taken along the same lines as FIG. 3, showing the first component engagement member mounted to the journaled shaft mounted in the "L" shaped frame.
Figure 7:
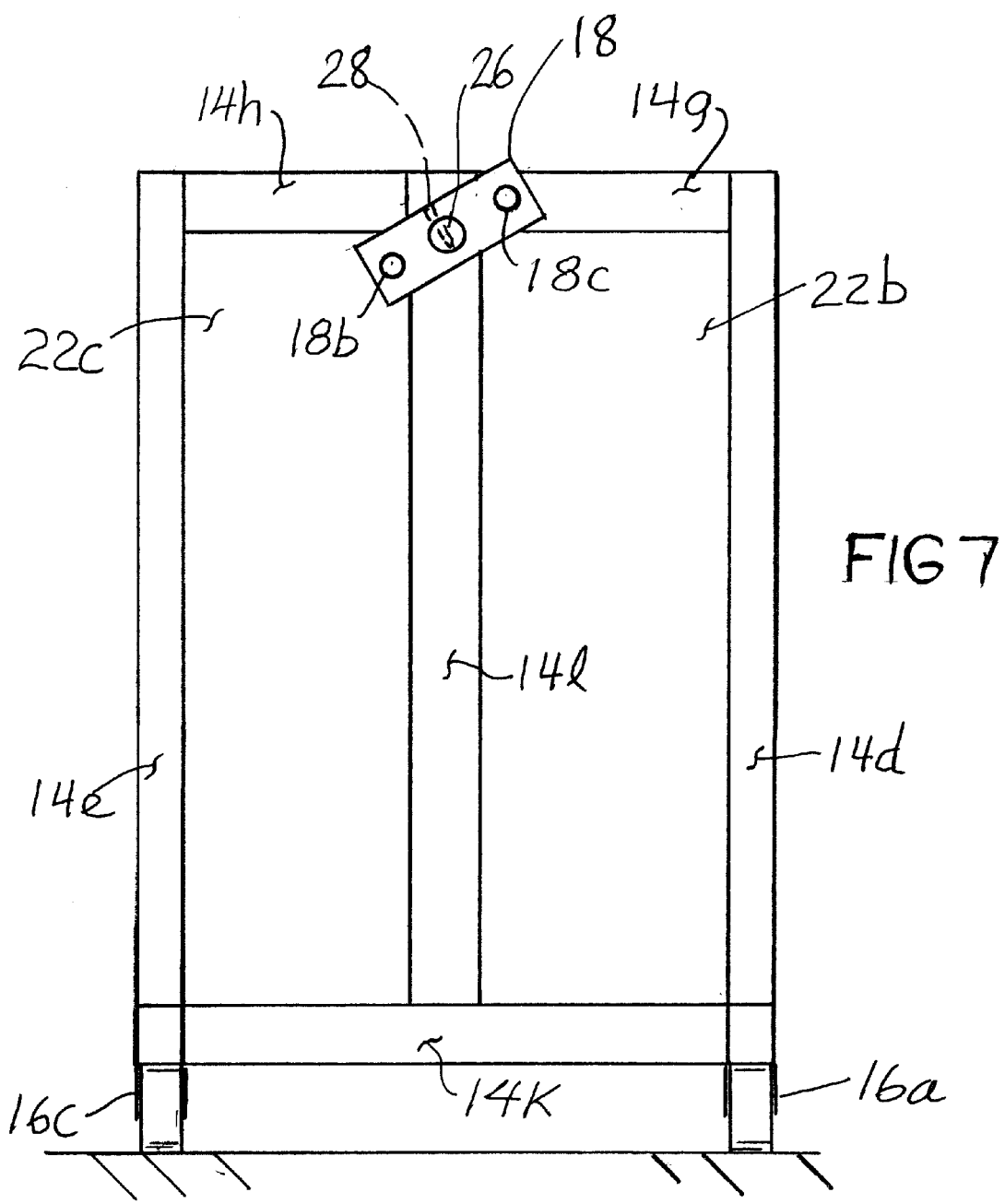
FIG. 7 is an end elevation view of the apparatus similar to FIG. 5, with the second component engagement member removed.

Referring to FIG. 6, there is shown a side elevation view along the same lines as FIG. 3, showing the first component engagement member 18 mounted on the shaft 26 as it would be without an engine and supporting second engagement member 32 attached thereto. In FIG. 7, another end elevation view, the first engagement member 18 is seen as it is attached to the shaft 26. The engagement member 18 is secured to the shaft 26 via a tapered pin 28 that is applied through an appropriate machined hole in the shaft 26. The tapered pin 28 engages both the shaft 26 and the engagement member 18 so that there is no play in the combination. Care is taken in the machining of the outside diameter of the shaft 26 and a mating bore 18a (FIG. 13) of the member 18 to avoid excessive play between the two parts. After assembly, the member 18 must be at a substantial right angle with the axis of the shaft 26 to prevent any possible wobble when the member 18 is rotated with a load. The shaft 26 is journaled in the frame construction defined by the vertical leg member 14l and 14m. The shaft 26 is suspended and supported in oilite bearings fixed in the vertical members 14l and 14m (the bearing supports for the shaft 26 will be described in more detail later while referring to FIG. 11).

Figure 8:
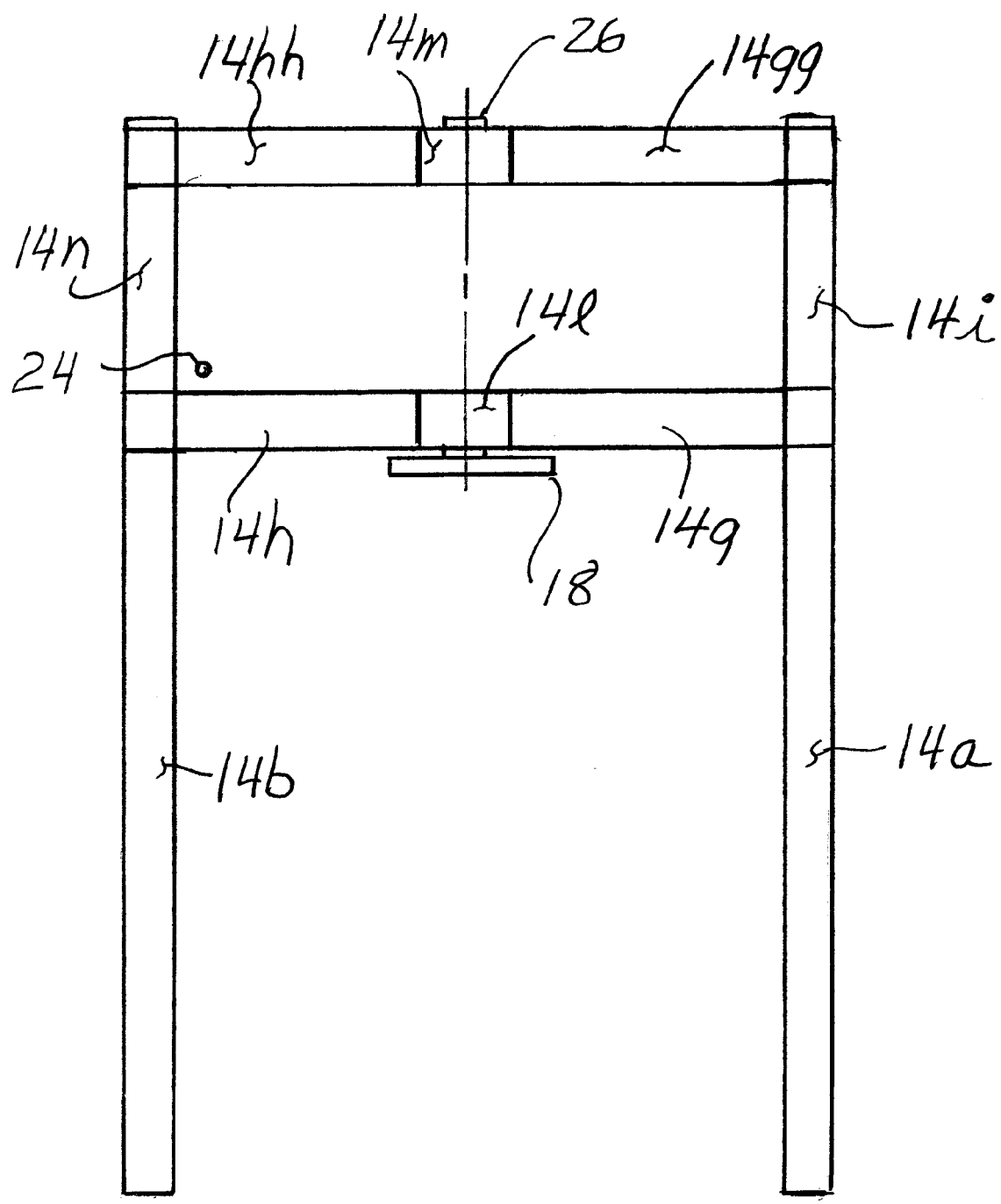
FIG. 8 is a top view of the vehicle component support and rotating apparatus showing the first component engagement member mounted on the support shaft
Figure 9:
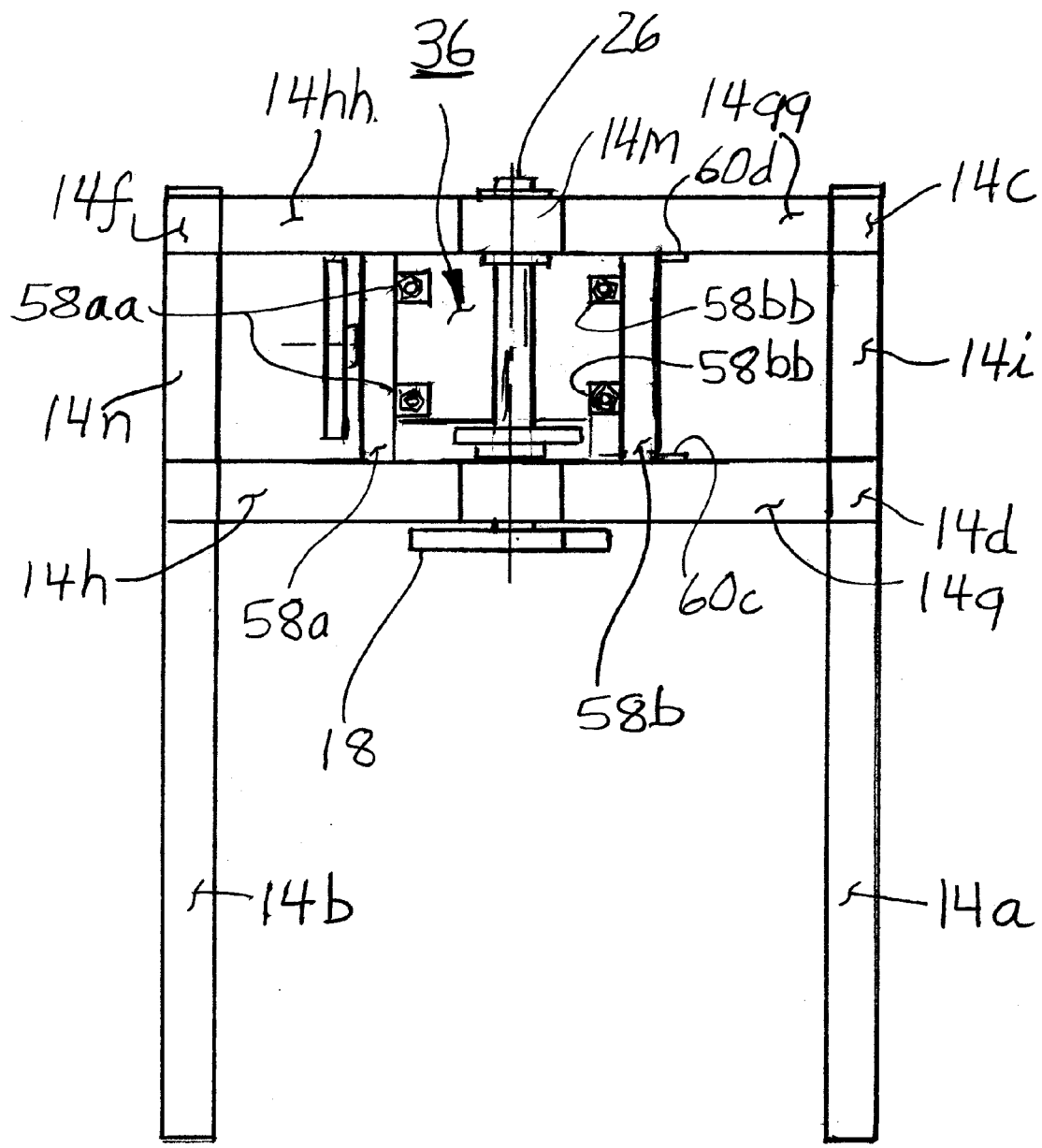
FIG. 9 is top view of the apparatus with the top cover removed from the upright leg of the L shaped frame to show the internal drive apparatus.

Referring to FIG. 8 there is shown a top view of the apparatus 10. In FIG. 9, a top view similar to FIG. 8, the cover 22d is removed to show a mechanical drive apparatus 36 that is shown as it is fitted between and secured to the frame members 14g, 14gg, 14h, 14hh, 14l, and 14m. The drive apparatus 36 is secured to those frame members by a suitable bracket which will be described further while referring to slightly enlarged views in FIGS. 11 and 12. Referring to FIG. 10, the drive apparatus 36 is seen between the aforementioned frames members 14g–14m, with the cover 22e removed for clarity. And, to now referring to FIGS. 11 and 12, more details of the mounting of the shaft 26, and the accompanying drive apparatus 36 will be described.

Figure 16:
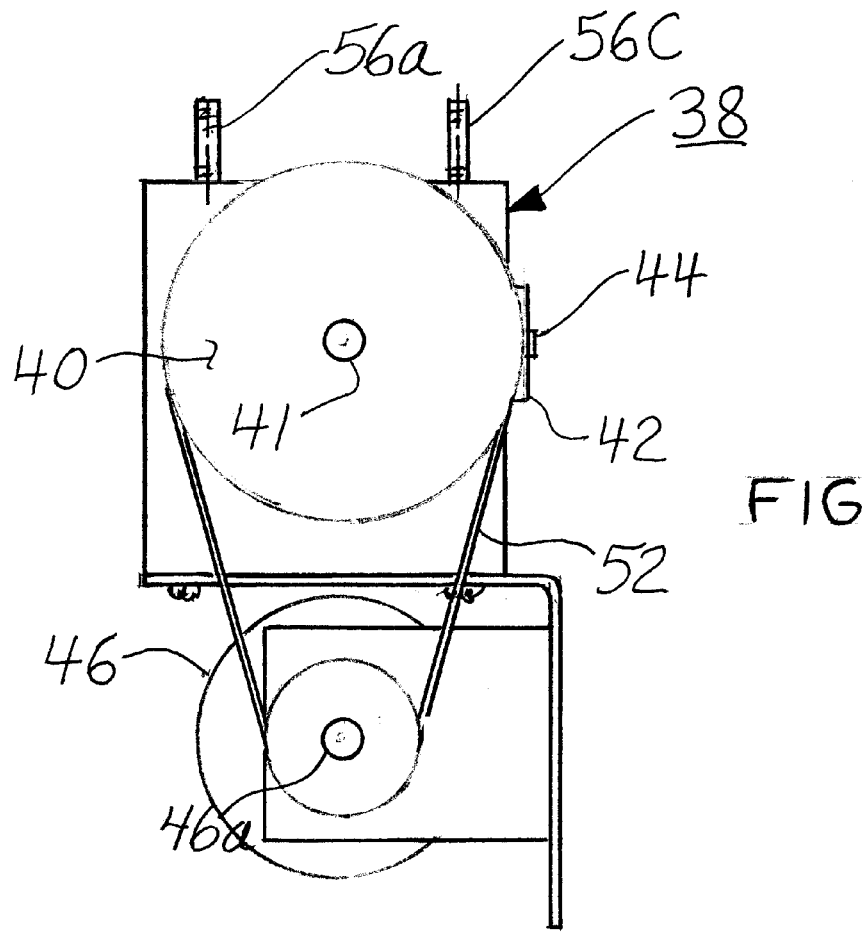
FIG. 16 is a side elevation view taken along the lines of FIG. 11 showing the drive apparatus as a sub-assembly.

In FIG. 10, and particularly the enlarged view of FIG. 11, which is taken along the same lines as FIG. 10, the drive apparatus 36 is shown as it is secured between the vertical frame member 14l and 14m. FIG. 16 is also referred to at this time wherein the drive apparatus 36 is shown outside and unassembled to the frame 14, in order to help explain the various components comprising the drive apparatus 36. FIG. 16 is taken along the same viewing lines as that seen in FIG. 11. There is a main gear box 38 shown that is the basic mechanical gear reduction speed reducer needed to provide a low output speed such as 3–5 RPM or less. A gear box such as gear box 38 (or similar transmission) may be purchased from Boston Gear Company, a supplier of such power assist items. The slower output speed will afford a greater amount of safety for the apparatus 10 when rotating heavy mass such as the example engine 20. The circuit for the present system is relay controlled so that the AC motor will be enabled upon enablement of the button 24. The attached drive apparatus provides a constant slow speed with a substantially instant start/stop when the button 24 is engaged. Higher speeds may be achieved, however a slow rotational speed/velocity is felt to be appropriate for such heavy mass as that being handled in the apparatus 10.

The gear box 38 has one large pulley 40 mounted on a shaft 41, on the output shaft 44 of gear box 38, and there is a chain sprocket 42 mounted on an output shaft 44. There is an AC motor 46 secured by appropriate hardware such as a screw 48a and 48b to a mounting bracket 50; the bracket 50 being one part of the method of securing the drive apparatus 36 to the frame 14 as will be described a bit later in the present specification. It should be mentioned that the AC motor 46 may be a DC motor, or equivalent, in order to provide any variable speed control for the load rotation desired. An appropriate circuit applied to a DC motor would enable such a system. A further control for the benefit of the operator is contemplated where RF devices may be employed. A remote controlled device will be an asset to a mechanic who is not able to reach the button 24 due to his/her location disposed away from the button 24.

There is a small pulley 54 mounted and secured to a shaft 46a of the motor 46, the pulley 54 of the V groove type for the present system, but can be a timing pulley with accompanying timing belt, or other non-slip variation of those compliant drive belt types commercially available.

Figure 17:
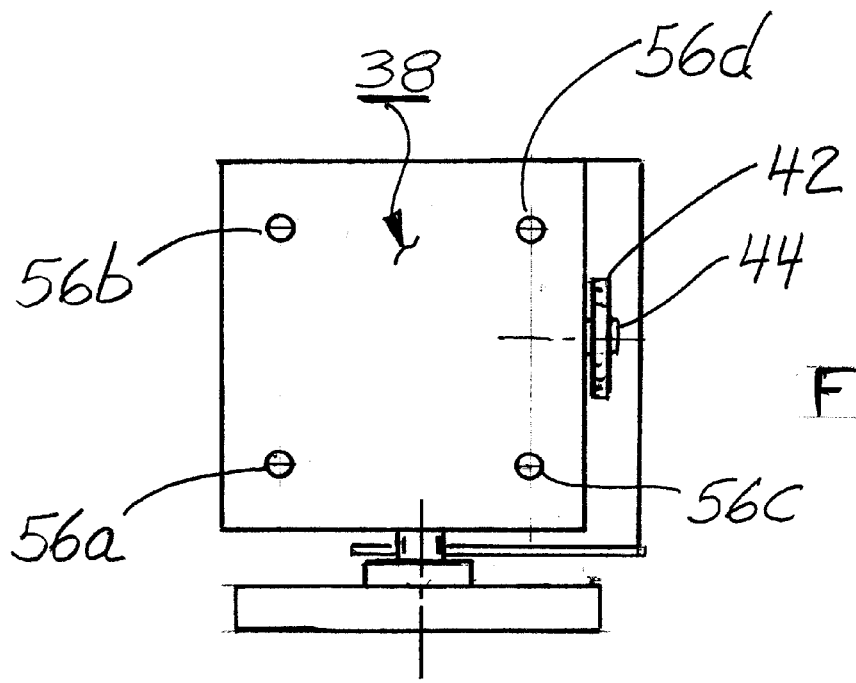
FIG. 17 is a top view of the drive apparatus taken from FIG. 16.

The drive apparatus 36 includes a V belt 52 that is suspended on the pulley 54 and the large pulley 40. The main gear box 38 has a set of four mounting screws; a screw 56a, 56b, 56c and 56d (FIGS. 16–17), which are used to vertically secure the drive apparatus to some rails welded inside of the frame 14 as will be described next. First referring to FIG. 9, there is a rail 58a and 58b that are welded to the cross members 14g, 14gg and 14h and 14hh respectively. Each of the rails 58a and 58b has some additional brace members welded to each rail that will engage the drive apparatus 36. For example, the rail 58a has two brace members, both labeled 58aa for simplicity, and correspondingly, the rail 58b has two brace members both labeled 58bb, all braces 58aa and 58bb in both instances being welded to the rails 58a and 58b as required to match the gear box screws 56a, 56b, 56c and 56d illustrated in FIG. 17. The rails 58a and 58b are also welded to individual brackets 60a, 60b, 60c and 60d (FIGS. 9–11); all of which are welded to the frame members 14hh, 14h, 14gg, and 14g.

The drive apparatus 36 is installed into the cavity defined between the frame members 14l, 14m, 14g, 14gg, 14h, and 14hh during the assembly of the apparatus 10 at the manufacturing stage. The drive apparatus 36 is secured to the apparatus 10 by the screws 56a, 56b, 56c, and 56d (FIGS. 16–17) by installing a suitable nut 62a (Four times as shown in FIGS. 10, 11–12) on each screw 56a–56d. Then the drive apparatus 36 may be vertically adjusted within the frame 14 by virtue of the nut 62a (four) as is necessary. Vertical adjustment of the drive apparatus will provide tension to the drive chain to be described next. The drive apparatus 36 is also secured via suitable screws 64a (one shown in FIG. 12) that ties the bracket 50 to the vertical frame member 14l (FIGS. 11–12).

Now a drive chain 68 (FIG. 12) is attached to the drive apparatus 36 and to a corresponding drive sprocket 66 that is secured to the shaft 26 (by a machined groove in the shaft 26 and corresponding key not shown) as will be explained further. In FIGS. 11 & 12, the drive sprocket 66 is seen as it relates to the shaft 26, being secured to the shaft 26 for rotation therewith. In addition in FIGS. 11 and 12, the sprocket 66 is seen engaged with the chain 68 that is a standard ⅜ link chain, or a No. 40 chain or larger to carry the heavy vehicle component loads in the apparatus 10. The chain 68 is engaged with the output sprocket 42 from the gear box 38, and therefore will provide translated power to the shaft 26 upon energization of the motor 46. The shaft 26 is supported in the frame members 14l and 14m, as seen in FIG. 11. An oilite bearing 26d and 26e is typically applied to each frame member 14*l* and 14*m* respectively (bearing detail only shown in FIG. 11 with reference to the frame member 14*l*). The bearings 26*d* and 26*e* may be ball bearings or needle bearings if required, but the PV (Pressure—Velocity) requirements of the load bearing shaft 26 is satisfied with the oilite bearings. The shaft diameter for the present invention is 1½ inches in diameter which is enough to support the heaviest vehicle component intended to be serviced in the apparatus 10.

Upon energization of the motor 46, the shaft 26 will rotate with the first engagement member 18 rotating incrementally as is desired or by maintaining contact with the button 24 to achieve the slow 3–5 or less RPM velocity, to whatever position is desired for the attached load (engine 20 for example). The load to be attached (engine 20) involves the remaining second engagement member 32, some attachment hardware (a pair of bolts 20*f* (FIGS. 1, 2, & 3)) and the subject vehicle component load (engine 20) as will be described next.

The engine 20 as removed from a motor vehicle would be resting on a suitable table or support exterior to the apparatus 10 where the second engagement member 32 would then be fitted to the first engagement member 18 (FIGS. 2–3) but not attached to the engine 20. The engine 20 would also be positioned so that the end components and machined surfaces of the engine 20 are exposed for inspection as to mounting hardware or tapped holes. In the example of the engine 20, the crankshaft crank assembly 20*a* will be accessible at the end 20*b* of the engine 20. It may be possible to access and move the crankshaft assembly 20*a* on the bench or table, although difficult. The mechanic will have difficulty in inspecting all parts and components surrounding the periphery of the engine 20 however since there is no easy way to turn, maneuver or rotate the engine 20 to different positions on the bench or table which is one of the reasons the present invention became apparent.

The second engagement member 32 is shown attached to the end 20*b* of engine 20 in FIG. 1 and the engine 20 is mounted on the carriage 10. In FIG. 2 the second engagement member 32 is shown slightly apart from the end 20*b* of the engine 20, with two attachment screws 20*c* and 20*d* shown as they may be applied to the fastening the member 32 to the member 18. Initially the second engagement member 32 is compared with the engine 20 on the end 20*b* so that a pattern of fastening devices are selected as they will adapt to the member 32 at the time of transfer from a resting place (engine on the bench i.e.). The second engagement member 32 is then fastened to the aforementioned first engagement member 18 via two aligned apertures; an aperture 18*b* and corresponding aperture 18*c* (described with reference to FIG. 13 later) that are machined into the member 18 (FIG. 2). The screw 20*c* and 20*d* (FIG. 2) are then applied to the assembly process of attaching the second engagement member 32 to the member 18. Then, using at least two screws 20*f* (FIGS. 1, 2 and 3), the engine 20 is fastened to the second engagement member 32. Suitable nuts (18*e*, 18*f* described below) are applied to the screws 20*c* and 20*d* to complete this process.

The hardware (screw 20*c*) described above may be ½ inch diameter or larger and (screws 20*d* and 20*f*) described above should be ⅜" diameter or larger bolts accompanying locknuts such as a locknut 18*e* and 18*f* shown in FIG. 2. The hardware may alternately consist of fixed threaded studs that are already applied to the end 20*a* of the engine 20, and fixed studs that are applied to the first engagement member 18 in order to facilitate easier assembly of the engine 20 to the associated engagement members 32 and 18 respectively (appropriate locking nuts would then be applied to the resulting assembly). Described previously, it is emphasized that the assembly of the second engagement member 32 is pre-determined by the mechanic at the bench stage. The mechanic is aware of the engine type and the machined apertures and mounting devices that are part of the end 20*b* (i.e.) of the engine 20. The pattern of such mounting devices described in reference to engines, including tapped holes is pre-disposed on such manufactured vehicle components. Accordingly the second engagement member 32 has a pattern of predetermined apertures defined generally as a pattern 32*g* (FIG. 14) that will adapt to those different vehicle components so that when attached, a balanced condition will result. This means that when the second engagement member 32 is attached to the first engagement member 18, the resulting mass including the engine 20 will be inertially balanced for rotation about the center of mass of the subject component. In this case, it is the engine 20 that is substantially balanced, and as loaded on the support apparatus constituting that described above with reference to the carriage frame 14, the rotatable shaft 26 and attached engagement members 18 and 32. Any rotation of this mass via the instrumentalities to be described in reference to the attached drive apparatus 36 will be described below. Rotation of the resulting mass including the engine 20, and supporting members 18 and 32 will be of minimal effort on the part of the attached drive apparatus 36 because of the predetermined effort to attain a balanced inertial effect.

It is possible to slightly reverse the assembly procedure by initially attaching the second engagement member 32 to the engine 20 at the end 20*b*. In this case, it may be necessary to maneuver the first engagement member 18 as mounted on the rotatable shaft 26, to position same for installing the engine 20 with the attached second engagement member 32. This is a bit more awkward because of having to rotate the first engagement member to gain access to the attachment apertures 18*b* and 18*c* as is required to insert a pair of suitable bolts, with appropriate nuts to attach the members 18 and 32 together. To make this easier, it is possible to reconstruct the shapes of both the first and second engagement members 18 and 32 to suit such an assembly. For example, by making the first engagement member 18 triangular shaped, or extending the length of the part slightly to suit. In all cases, it is necessary to have at least two attachment apertures such as 18*b* and 18*c*, in order to maintain balance of the remaining components (engine 20 and second engagement member 32) when so attached.

A point to consider is that the engagement members 18 and 32 may also be manufactured as a single engagement member or composite part. If this were the case, and it is possible, to manufacture such a part, it would be necessary to fit the new engagement member representing the aforementioned members 18 and 32 so that the machined apertures described above, are all included, and that consideration for the attachment and alignment to the shaft 26 be included. This would require very exact machining of the bore of the new engagement member with the shaft 26, and there would be a very reliable and likely expensive attachment device required to secure the new member to the shaft 26. While this is possible, the present invention elaborates on the separate engagement members 18 and 32 since separate engagement members representing attachment patterns for transmissions, rear end differentials and so forth are easily manufactured, and are more easily attached to each other in the assembly process defined in the instant invention.

Referring to FIG. 13, the first component engagement member 18 is seen as a generally rectangular plate with three apertures. The center hole as previously defined is the mating bore 18a adaptable to the shaft 26, and the two accompanying apertures 18b and 18c are the mating location holes that match equivalent holes (or apertures, or welded studs) in the second component engagement member 32. The member 18 may have radii (not shown) on either end, thought to be an obvious addition that can be machined into the part if necessary to secure additional operator protection. Since the button 24 (FIGS. 1 & 2) is located at the topmost portion of the "L" shaped frame as previously described, it is believed there is enough provision (the connected geared down drive apparatus 36) for stopping the revolving shaft 26 and associated load created by the attached mass during operation. The button 24 must be held down manually in the present design in order to operate the drive apparatus 36 as contemplated by the inventor.

The second component engagement member 32 as depicted in FIG. 14 has a generally arcuate shape 32h that is defined by a major radius R1 and R4 resulting in an arcuate or crescent shape along a long edge 32h of the member 32. The long edge 32h is arcuate, or crescent shaped, in order to minimize mass. A center C1 of radius R1 is generally located at the centerline of a theoretical crankshaft centerline, referenced in the present specification in the prior description of the engine 20 and the crankshaft assembly 20a. In addition, a center C2 of radius R2 may be generally located in the same geometric area as the center C1. To define cutout 32a by radius R2 with the center of that radius being located at C2 and radius R3 with the center being located at C1, a resulting cutout 32a is sufficient to clear the assembly of such crankshaft assemblies as that defined in the prior description of item 20a, but may be adjusted by machining if necessary to clear other components as well.

The pattern of apertures 32g (FIG. 14) will match the pattern designed into a particular vehicle component being considered for service/inspection, and so will be applied to the aforementioned hardware for attachment to the vehicle component for example in the present case, engine 20. Previously mentioned, other engagement members such as member 32 may be manufactured with patterns that suit a particular line of engines, transmissions, or rear end differentials. The pattern 32g would be adjusted to suit these conditions if necessary, or to suit the design of manufactured vehicles components having different mounting surfaces like the end 20b of the engine 20 described in the present specification.

A situation may arise where the mechanic may have to manually move or manipulate other parts (transmissions, rear end differentials for example) to rotate and observe the operation of various internal engine components or other engine components. In effect the machined radius R2 as shown in the member 32 (FIG. 14) partially surrounds such assemblies as that defined in the form of a crankshaft assembly of such an engine. The overall general arcuate shape of the second member 32 is generally symmetrical, thereby adding to the intent to create a balanced mass upon attachment to a vehicle component. (To be inertially balanced by itself, the design of the member 32 would be completely circular, with a corresponding unified pattern of apertures). A circular design such as that discussed above is not appropriate for the intent of the present invention, which is to provide sufficient clearance to access certain functional components of the vehicle components. It will be understood by those skilled in the art that the general arcuate shape 32a of the member 32 may be altered as is required by design to include rounded ends, or other shapes. The member 32 as described has a squared off shape on opposing ends generally identified as an end 32d. The end 32d is disposed at each end of the member 32, and is symmetrical with respect to the center C1, C2 and C3.

The thickness of each engagement member 18 and 32 is ½ to 1-inch thick cold rolled steel plate which is easily manufactured by machining. The pattern of apertures (mounting holes) or weld locators for weld studs having threaded portions may easily be applied in such manufacturing processes as is familiar to those skilled in the art. The engagement member 18 is generally an elongated rectangular plate of the thickness specified, with three appropriate machined apertures, two of which are the apertures 18b and 18c that match the corresponding mounting apertures or a pair of weld studs on the second engagement member 32 (described in the following).

It is emphasized that the pattern of apertures 32g in the second component engagement member 32 (which may be threaded studs depending on the vehicle component) is defined by the pattern of machine holes or other hardware in as many engine types as is possible in order to adapt to those engines as defined in the prior specification. The position of the apertures in pattern 32g is predetermined to match such engine types, so that there is a minimal requirement of adapting the member 32 to those engine types, with the final result being an inertially balanced mass that requires minimal effort or power to rotate once assembled to the first component engagement member 18 on the "L" shaped carriage 14. The second component engagement member 32 is predetermined to the extent possible to fit many vehicle components by virtue of the predetermined pattern of the apertures 32g.

Referring to FIG. 15, there is an alternate version of a second component engagement member 90, which may apply to some vehicle components at an advantage over the arcuate version previously defined (32), the member 90 being generally rectangular in nature, and generally symmetrical about a theoretical crankshaft centerline C3 of an engine. The shape of the second engagement member may be altered as is required through machining if there is a particular engine type, transmission type, or rear end differential that is better suited to the slightly larger design of the alternate second member 90. It is possible to construct the member 32 and alternate 90 in other patterns, but it is necessary to consider the balanced shape when other profiles or shapes are considered.

Once again, the objective is to have the second component engagement member 32 or 90 adapt to a vehicle component with a resulting balanced mass that does not spin or rotate on its own when mounted in the "L" shaped carriage (when mounted on the shaft 26, the combination of members 18 and 32 does not have enough mass to cause a sudden rotational movement because of the attached drive apparatus 36).

The alternate member 90 is adaptable to the first component engagement member 18 in the same manner as that described for the member 32, so attachment screws, bolts, or mounted threaded studs, may be used for the actual attachment when required. The member 90 may be modified as is necessary to suit particular vehicle components.

The drive apparatus 36 previously described is the mechanics power tool for indexing the vehicle component mounted on the frame 14. The engine 20 is finally securely attached to the aforementioned second engagement member 32, the engagement member 18 is securely attached to the journaled shaft 26 and the journaled shaft 26 is securely mounted for rotation in the bearings (i.e. 26d, 26e) that are fixed in the frame 14. The drive apparatus 36 may be incrementally jogged through the jogging button 24 so that the engine 20 is indexed as is required for inspection, replacement of parts, and so forth. The second engagement member 32 has a semi-circular cutout 32a (FIG. 2 & FIG. 14) provides an opportunity to access the crankshaft assembly 20b of the engine 20. This makes it possible for the mechanic to manually rotate the crankshaft assembly 20b of the engine 20 to pre-determine positions deemed necessary to inspect various engine components such as valves, pistons, etc.

Figure 18:
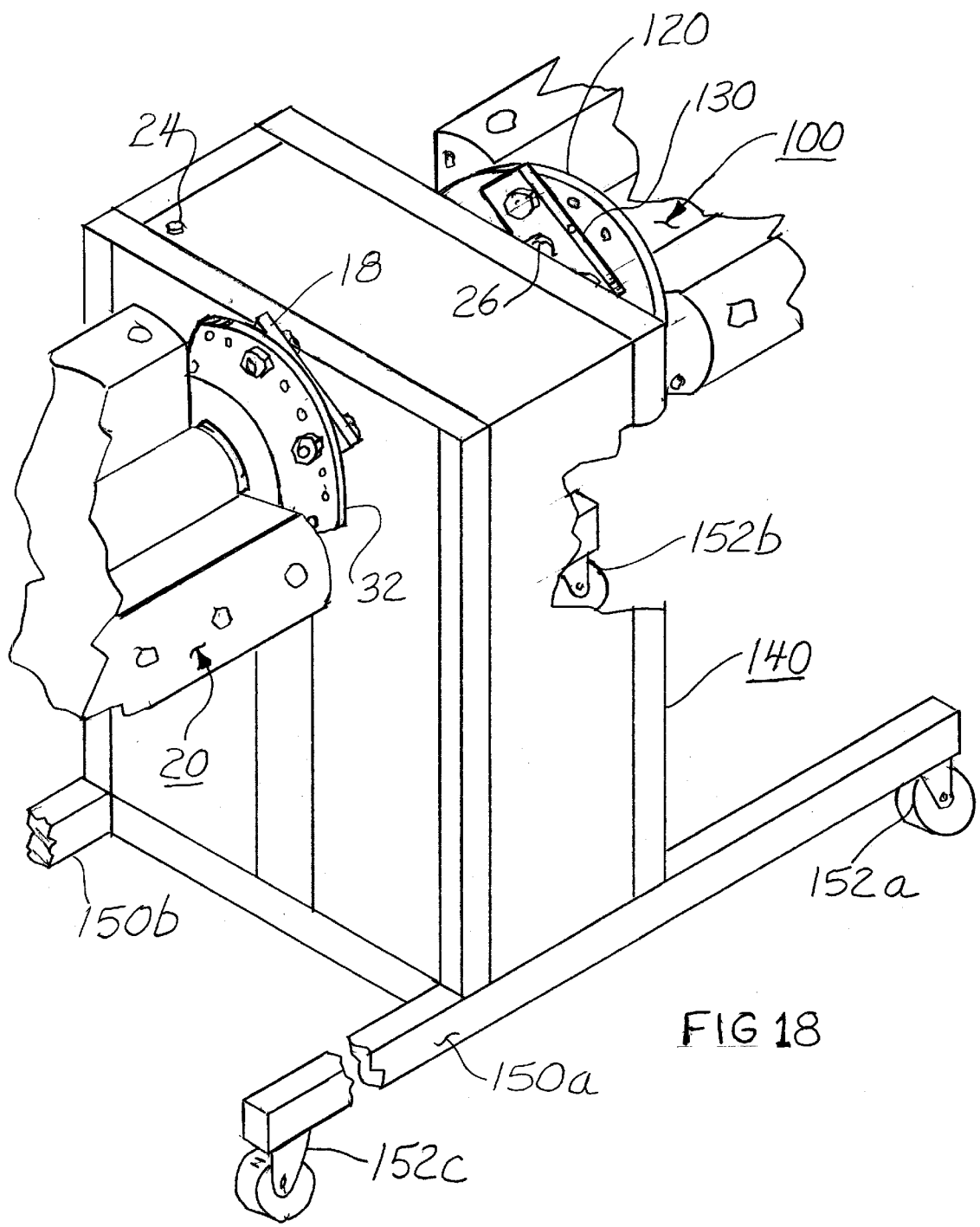
FIG. 18 is an isometric view similar to FIG. 1, showing a second engine mounted on a "T" shaped frame carriage (the "T" is inverted)

There is another embodiment of the present invention as is shown in FIG. 18 where it is desired to work on two similar vehicle components. This may be a situation where for example, the engine 20 as shown in FIG. 18 is being repaired, or parts are being transferred to a new or different engine (two engines of the same type and mass). It may be desirable to transfer some or all engine components from the old engine (engine 20) to a new engine 100. The same mounting procedure described earlier in this specification is used; with a first engagement member 18 (similar to member 18 in FIG. 1) now mounted on both ends of the shaft 26. The second engine 100 is mounted to a second, second engagement member 120 which is mounted to a second, first engagement member 130 (same as the member 18). Both engines 20 and 100 are inertially balanced via the mounting hardware previously described with reference to the first and second engagement members 18, 32, 130 and 120 respectively. The second, first engagement member 130, and the second, second engagement member 120 are applied to the engine 100 in the same identical manner as that previously described for the engine 20. (Previously it is described how the engagement member 32 is mounted to the engagement member 18 and then the engine 20 is assembled to the engagement member 32 (FIGS. 1, 2)).

The drive apparatus 36 (not shown) is connected in the same way as previously described to the journaled shaft 26, and is operational via the jogging button 24. Now, both engine 20 and 100 are indexed via enablement of the button 24 and associated drive apparatus 36 to a predetermined position by the mechanic, both engines 20 and 100 respectively secured to their respective mounting members 18, 32, 130, and 120 and secured to the shaft 26 through the component members 18 and 130 as previously described. This arrangement may be operated in synchronization or a timed relationship so that similar areas of each vehicle component are accessible and visible to the mechanic. A carriage 140 suspends the support apparatus on an extended carriage frame that has similar mounting wheels for maneuvering (steering) the carriage frame 140 to desired positions or locations. The frame 140 has a horizontal base leg 150a and 150b that are similar but longer than the members 14a and 14b defined for the apparatus in FIGS. 1 and 2. In this case a wheel assembly 152a and 152b will swing or steer thereby permitting maneuverability of the carriage frame 140, while a wheel 152c and 152d (not shown) support the carriage for rolling displacement (non-steering) only.

Figure 19:
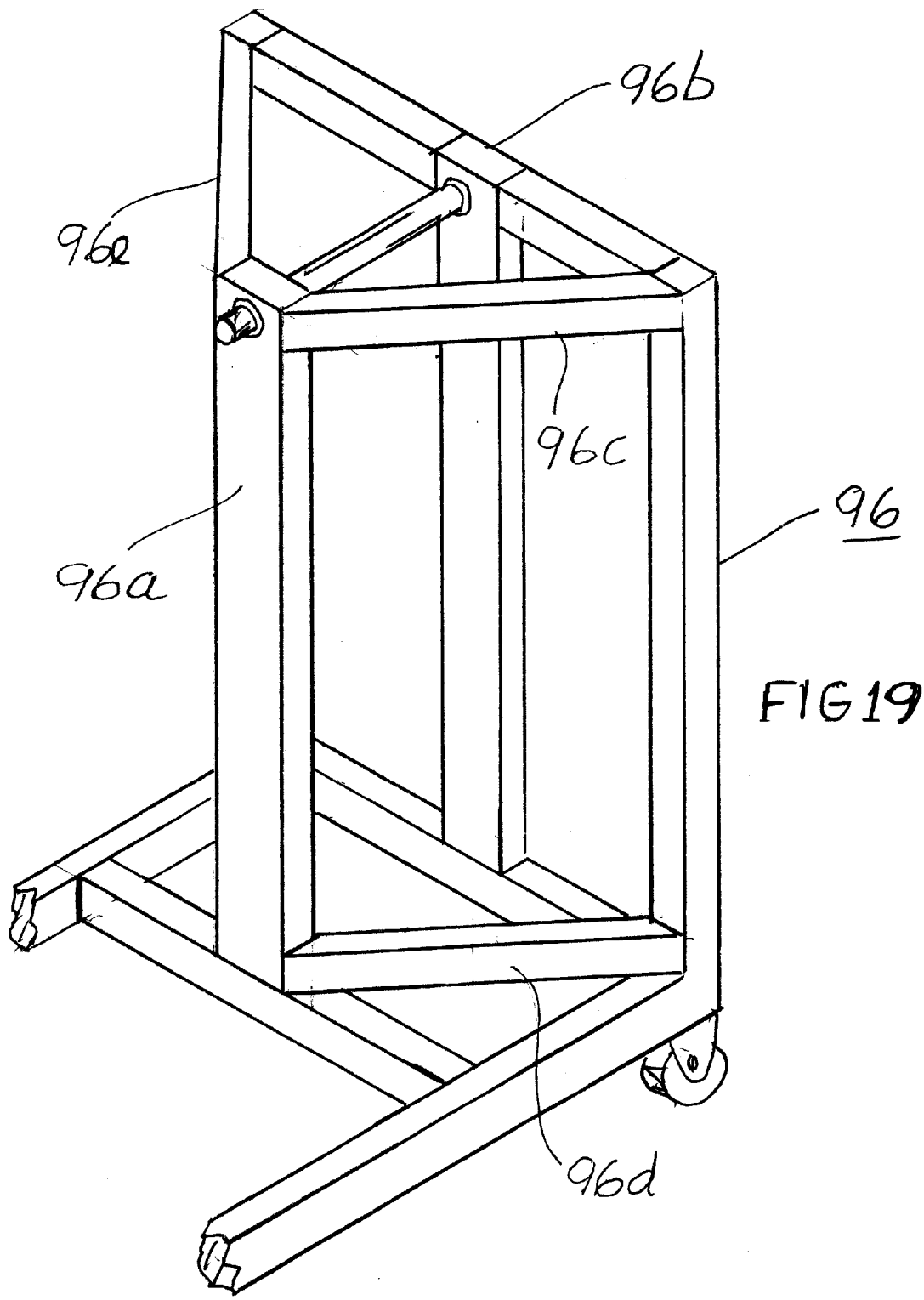
FIG. 19 is an isometric view showing an alternate construction of the "L" shaped frame of the present invention.

Another feature of the present invention includes an alternate "L" shaped frame 96 as seen in FIG. 19. The design of the frame 96 is similar to the prior frame 14 described in that all frame components are welded together, and the frame has the familiar "L" shape, the upper portion (or leg) of which will support a vehicle component mounted on the same component engagement members previously described (members 18 and 32). The same journaled shaft 26 previously defined is mounted in bearings held in a frame member 96a and 96b. The frame 96 is viewed for clarity in a partially assembled stage where the drive apparatus or covers have not yet been added. The principal difference between the frame 96 and the frame 14 previously described is the frame members 96c, 96d, 96e and another structural frame member (not shown) similar to member 96d which together, as welded form a general pyramid or diamond shape when viewed from an overhead position. The construction of the "L" frame in this case permits even more access to the area surrounding an attached engine such as engine 20 described with reference to FIGS. 1 and 2. The frame members 96c and so forth are "cut back" or positioned in a direction that leads away from the engine being serviced, which permits greater space for the mechanic to grasp the crankshaft assembly or other devices that require manual manipulation on a vehicle component. It will be recognized by those skilled in the art that the pyramid or diamond shape described above may be applied to the double vehicle component support apparatus described above in reference to the FIG. 18 and the frame 140.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

What is claimed is:

1. A carriage mounted support and rotatable positioning apparatus for vehicle components, the apparatus comprising:
    an L shaped frame;
    a first engagement member of any size or shape fixedly mounted on a rotatable shaft journaled in a leg of the L shaped frame;
    a second engagement member removably attached to the first engagement member, the second engagement member having a pattern of apertures or attachment devices that match a pattern of apertures or attachment devices of at least one kind of a vehicle component wherein attachment of the first engagement member to the second engagement member and an attached vehicle component forms a balanced inertial mass according to a predetermined attachment relationship between the second engagement member and the vehicle component;
    a drive apparatus fixedly attached to the frame and operationally connected to the rotatable shaft for indexing the vehicle component to a predetermined position.
    wherein the second engagement member has a generally rectangular shape with a semi-circular cutout on a long edge of the second engagement member.

2. A carriage mounted support and rotatable positioning apparatus for vehicle components, the apparatus comprising:
    an L shaped frame;
    a first engagement member of any size or shape fixedly mounted on a rotatable shaft journaled in a leg of the L shaped frame;
    a second engagement member removably attached to the first engagement member, the second engagement member having a pattern of apertures or attachment devices that match a pattern of apertures or attachment devices of at least one kind of a vehicle component wherein attachment of the first engagement member to the second engagement member and an attached vehicle component forms a balanced inertial mass according to a predetermined attachment relationship between the second engagement member and the vehicle component;

a driven apparatus fixedly attached to the frame and operationally connected to the rotatable shaft for indexing the vehicle component to a predetermined position, wherein the drive apparatus includes an AC Motor and an operatively connected reduction drive assembly connected to the rotatable shaft.

3. A carriage mounted support and rotatable positioning apparatus for vehicle components, the apparatus comprising:

an L shaped frame;

a first engagement member of any size or shape fixedly mounted on a rotatable shaft journaled in a leg of the L shaped frame;

a second engagement member removably attached to the first engagement member, the second engagement member having a pattern of apertures or attachment devices that match a pattern of apertures or attachment devices of at least one kind of a vehicle component wherein attachment of the first engagement member to the second engagement member and an attached vehicle component forms a balanced inertial mass according to a predetermined attachment relationship between the second engagement member and the vehicle component;

a drive apparatus fixedly attached to the frame and operationally connected to the rotatable shaft for indexing the vehicle component to a predetermined position, wherein the drive apparatus includes an AC Motor and an operatively connected reduction drive connected to the rotatable shaft.

* * * * *